United States Patent
Dosluoglu

(10) Patent No.: US 7,479,995 B2
(45) Date of Patent: Jan. 20, 2009

(54) ON CHIP REAL TIME FPN CORRECTION WITHOUT IMAGER SIZE MEMORY

(75) Inventor: Taner Dosluoglu, New York, NY (US)

(73) Assignee: Digital Imaging Systems GmbH, Kirchheim, Teck-Nabern (DE)

( * ) Notice: Subject to any disclaimer, the term of this patent is extended or adjusted under 35 U.S.C. 154(b) by 634 days.

(21) Appl. No.: 11/132,769

(22) Filed: May 19, 2005

(65) Prior Publication Data

US 2006/0262204 A1    Nov. 23, 2006

(51) Int. Cl.
H04N 5/217    (2006.01)
H04N 9/64    (2006.01)

(52) U.S. Cl. .......................... 348/241; 348/243; 348/248

(58) Field of Classification Search ............. 348/222.1, 348/207.99, 257, 241–251, 294–324
See application file for complete search history.

(56) References Cited

U.S. PATENT DOCUMENTS

| | | | | |
|---|---|---|---|---|
| 5,162,670 A * | 11/1992 | Itakura et al. | ................... | 327/93 |
| 5,969,758 A * | 10/1999 | Sauer et al. | ................... | 348/241 |
| 6,128,039 A | 10/2000 | Chen et al. | ................... | 348/294 |
| 6,166,767 A | 12/2000 | Watanabe | ................... | 348/301 |
| 6,166,769 A * | 12/2000 | Yonemoto et al. | ........... | 348/308 |
| 6,215,113 B1 * | 4/2001 | Chen et al. | ............... | 250/208.1 |
| 6,320,616 B1 | 11/2001 | Sauer | ......................... | 348/241 |
| 6,466,265 B1 * | 10/2002 | Lee et al. | ................... | 348/308 |
| 6,473,124 B1 * | 10/2002 | Panicacci et al. | ........... | 348/241 |
| 6,801,258 B1 | 10/2004 | Pain et al. | .................... | 348/302 |
| 6,859,227 B1 * | 2/2005 | Andersson et al. | .......... | 348/241 |
| 6,950,137 B1 * | 9/2005 | Tanaka | ....................... | 348/308 |
| 2004/0036783 A1 * | 2/2004 | Barna | ........................ | 348/300 |
| 2004/0251394 A1 * | 12/2004 | Rhodes et al. | ........... | 250/208.1 |

* cited by examiner

Primary Examiner—Lin Ye
Assistant Examiner—Marly Camargo
(74) Attorney, Agent, or Firm—Saile Ackerman LLC; Stephen B. Ackerman; Larry J. Prescott

(57) ABSTRACT

A circuit and method for correcting pixel output signals for fixed pattern noise. Pixels in a selected row of pixels are read after an integration period and the resulting signals are stored in a first sample and hold circuit for each column. The pixels in the selected row are then reset and immediately read again and the resulting signals are stored in a second sample and hold circuit for each column. The signals in the second sample and hold circuits are subtracted from the signals in the first sample and hold circuits to produce signals related to the light seen by the pixels in the selected row corrected for fixed pattern noise. The output of the first sample and hold circuits and second sample and hold circuits can be connected to a subtraction unit and sequentially activated so that a single subtraction unit is required for the entire imager. The output of the subtraction unit can connected to a buffer thereby storing signals corrected for fixed pattern noise in the buffer using only a single subtraction unit and avoiding the need for a large memory to store dark pixel signals.

19 Claims, 3 Drawing Sheets

US 7,479,995 B2

ON CHIP REAL TIME FPN CORRECTION WITHOUT IMAGER SIZE MEMORY

BACKGROUND OF THE INVENTION (1) Field of the Invention

This invention relates to correction for fixed pattern noise, FPN, and more particularly to on chip correction of column based fixed pattern noise using dual column readout without the need for a large image size memory.

(2) Description of Related Art

U.S. Pat. No. 6,801,258 B1 to Pain et al. describes an imager which can be configured for multi-resolution capability where the signal to noise ratio (SNR) can be adjusted for optimum low-level detectability.

U.S. Pat. No. 6,320,616 B1 to Sauer describes methods for reducing fixed pattern noise (FTN) in complimentary metal oxide semiconductor (CMOS) image sensors.

U.S. Pat. No. 6,166,767 to Watanabe describes an active solid state imaging device which can reduce fixed pattern noise.

U.S. Pat. No. 6,128,039 to Chen et al. describes a column amplifier for high fixed pattern noise reduction.

U.S. Pat. No. 5,969,758 to Sauer et al. describe methods for correcting for DC offset and gain differences between correlated double sampling circuits of a row of correlated double sampling circuits of an imager.

SUMMARY OF THE INVENTION

Fixed pattern noise (FPN) can be either row based or column based and contributes to degradation of the quality of an image detected by an imager. Fixed pattern noise can have a number of causes such as differences in supply voltage delivered to different amplifier circuits, difference in amplification of different amplifier circuits, or the like. Typically correction for fixed pattern noise involves storing a dark signal level for each pixel in an imager which will be subtracted from the light related signal detected by each pixel in the imager to produce an image corrected for fixed pattern noise. This requires a large memory and additional signal processing.

It is a principle objective of this invention to provide a method of correcting for fixed pattern noise in an imager without requiring a large memory to store correction coefficients.

It is another principle objective of this invention to provide a circuit which will correct for fixed pattern noise in an imager without requiring a large memory to store correction coefficients.

These objectives are achieved by reading a current row of pixels after an integration period to obtain a signal related to the light impinging on the pixel during the integration period in addition to fixed pattern noise. This light related signal is stored in a first sample and hold circuit. The pixels are reset and immediately read again to obtain a dark pixel signal, due to fixed pattern noise, for the current row of pixels which is stored in a second sample and hold circuit for each column. The pixels in the current row of pixels are reset and are prepared for the next integration period. The dark current signal stored in the second sample and hold circuit is subtracted from the light related signal stored in the first sample and hold circuit to obtain a light related signal corrected for fixed pattern noise.

This subtraction is accomplished by connecting the outputs of the first sample and hold circuits to a first input of a subtraction unit and the outputs of the second sample and hold circuits to a second input of the same subtraction unit. As the combination of first and second sample and hold circuits for each column are sequentially activated the subtraction unit subtracts the output of the second sample and hold circuit from the output of the first sample and hold circuit for the activated column. This produces a light related signal corrected for fixed pattern noise at the output of the subtraction unit. The output of the subtraction unit is connected to a buffer.

The subtraction operation can be done in either the digital or analog domain and, since it is accomplished at the time the signals are read, a large memory to store dark current signals for the entire imager is not required. Only one subtraction unit is required for the imager.

DESCRIPTION OF THE PREFERRED EMBODIMENTS

Figure 1:
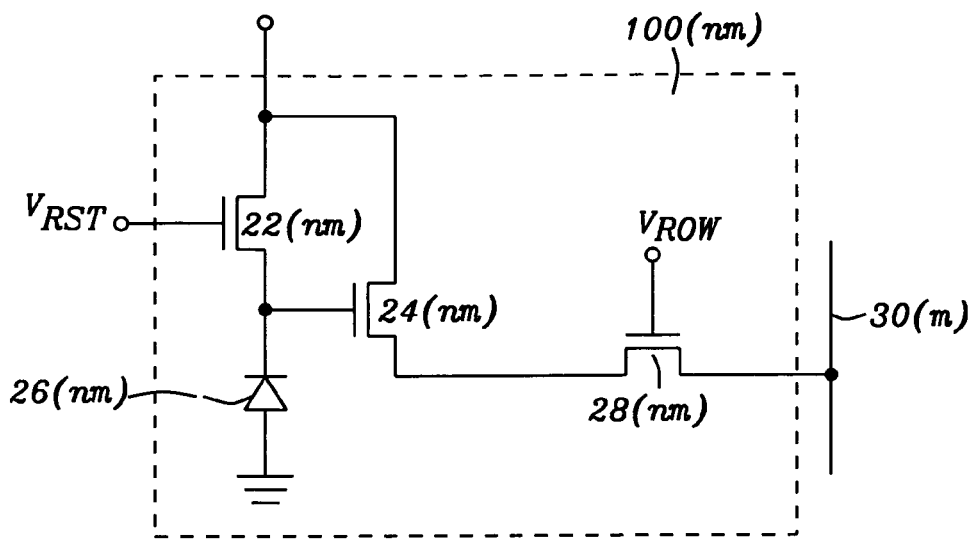
FIG. 1 shows a schematic diagram of one of the active pixel circuits an imager having an array of active pixel circuits.

Refer now to the drawings for a description of the preferred embodiments of this invention. In the following description all transistors are field effect transistors, FETs, and will be described simply as transistors. FIG. 1 shows a schematic diagram of one of the pixels $100(nm)$ in an imager having an array of N rows and M columns of pixels. The pixel $100(nm)$ is in row n and column m, where n is a running integer variable from 1 to N and m is a running integer variable from 1 to M. The pixel shown in FIG. 1 has a reset transistor $22(nm)$ having a source connected to a power supply and a drain connected to a photo detector $26(nm)$, in this example a photodiode. A reset signal, $V_{RST}$, applied to the gate of the reset transistor $22(nm)$ allows the potential of the photodiode $26(nm)$ to be reset. A readout transistor $24(nm)$ senses the potential of the photodiode $26(nm)$ and when the row select transistor $28(nm)$ is turned on a signal related to the potential of the photodiode $26(nm)$ is connected to a column bus $30(m)$ for column m of the imager. There is a column bus for each column of the imager and the drains of each of the row select transistors in a column are connected to the row select bus for that column. The row select transistor $28(nm)$ is controlled by a signal, $V_{ROW}$, applied to the gate of the row select transistor $28(nm)$. When a row of pixels is selected, for example row L, all of the row select transistors $28(Lm)$ in that row of pixels are turned on and each column bus is in electrical communication with the pixel in the selected row and the same column. The row select transistors keep the pixels in non selected rows isolated from their respective column buses.

Figure 2:
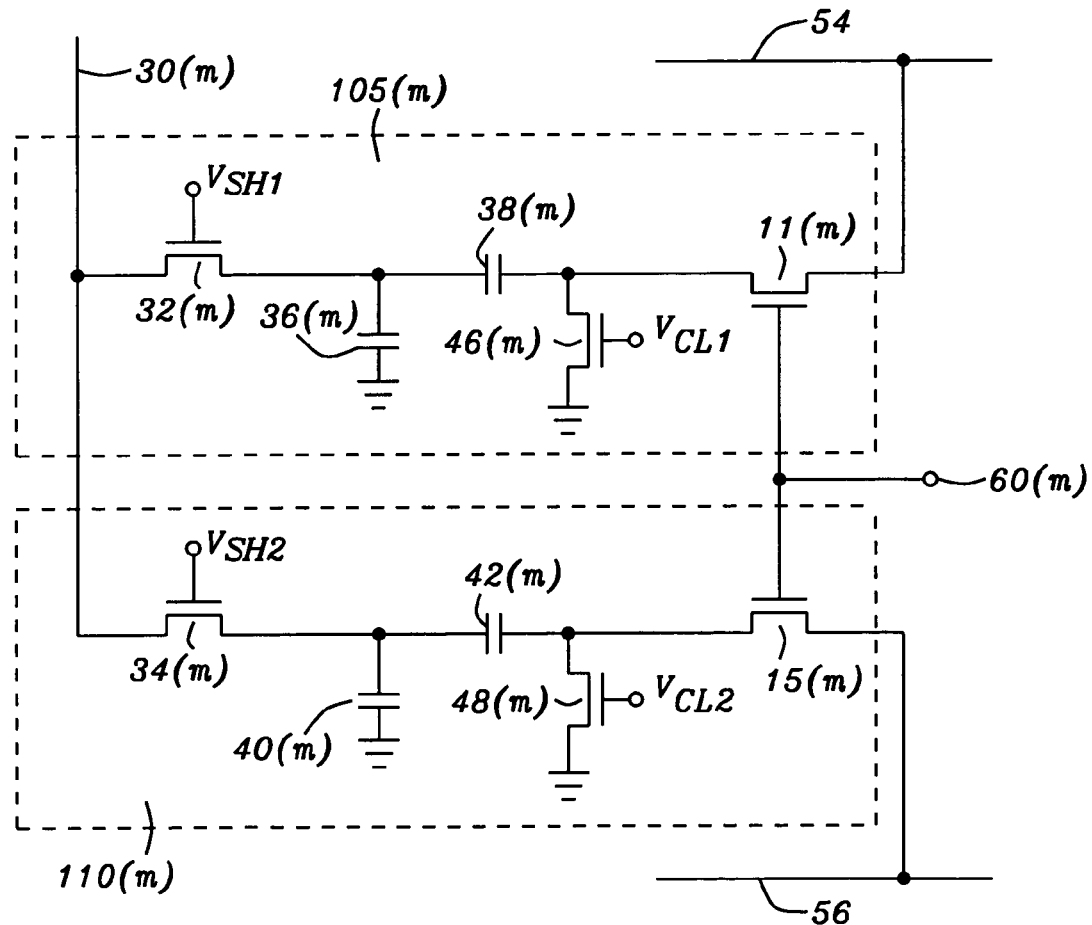
FIG. 2 shows a schematic diagram of a first and second sample and hold circuit for one of the columns of an imager having a first and a second sample and hold circuit for each column of pixels in the imager.

FIG. 2 shows a schematic diagram of an example of a sample and hold circuit pair having a first sample and hold circuit $105(m)$ and a second sample and hold circuit $110(m)$ for one of the columns, column m, of the imager. There is a sample and hold circuit pair for each column of the imager. Each first sample and hold circuit $105(m)$ has a first transistor $32(m)$, a second transistor $46(m)$, a third transistor $11(m)$, a first capacitor 36(m), and a second capacitor 38(m). Each second sample and hold circuit 110(m) has a first transistor 34(m), a second transistor 48(m), a third transistor 15(m), a first capacitor 40(m), and a second capacitor 42(m). The sources of the first transistor 32(m) of the first sample and hold circuit 105(m) and the first transistor 34(m) of the second sample and hold circuit 110(m) are connected to the column bus 30(m) and are in electrical communication with the potential of the photodiode 26(nm) of the selected row and the same column. The drain of the third transistor 11(m) of the first sample and hold circuit 105(m) is connected to a first output bus 54, as are the drains of the third transistors of all of the first sample and hold circuits in the imager. The drain of the third transistor 15(m) of the second sample and hold circuit 110(m) is connected to a second output bus 56, as are the drains of the third transistors of all of the second sample and hold circuits in the imager. The gates of the third transistor 11(m) of the first sample and hold circuit 105(m) for column m and the third transistor 15(m) of the second sample and hold circuit 110(m) for column m are connected to a column select node 60(m) for column m and a signal at the column select node 60(m) turns the third transistor 11(m) of the first sample and hold circuit 105(m) for column m and the third transistor 15(m) of the second sample and hold circuit 110(m) for column m on or off in pairs. There is a separate column select node 60(m) for each column in the imager and signals to the column select nodes 60(m) turn the third transistor 11(m) of the first sample and hold circuit 105(m) and the third transistor 15(m) of the second sample and hold circuit 110(m) for each column on in sequence. The third transistor 11(m) of the first sample and hold circuit 105(m) and the third transistor 15(m) of the second sample and hold circuit 110(m) for only one column are turned on at a time.

Figure 3:
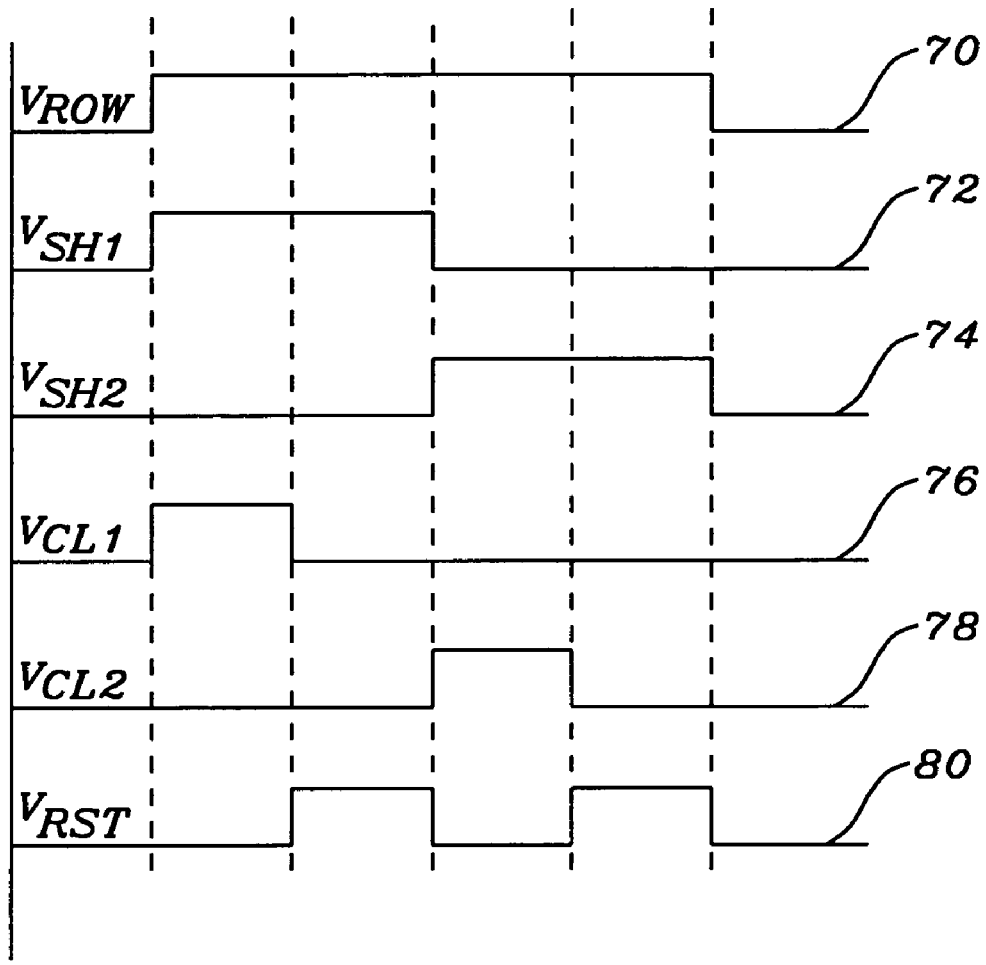
FIG. 3 shows a timing diagram for the method and circuits of this invention.

The operation of the pixels according to this invention will be described with reference to the circuit diagrams shown in FIGS. 1 and 2 and the timing diagram shown in FIG. 3. Following an integration period the pixels in a selected row, for example row L, are to be read and all of the row select transistors 28(Lm) for the selected row are turned on by the signal $V_{ROW}$ 70. At the same time the first 32(m) and second 46(m) transistors of the first sample and hold circuits 105(m) of each column are turned on by the signals $V_{SH1}$ 72 and $V_{CL1}$ 76, the first 34(m) and second 48(m) transistors of the second sample and hold circuits 110(m) of each column are maintained in the off state by the signals $V_{SH2}$ 74 and $V_{CL2}$ 78, and signals related to the potentials of the photodiodes 26(Lm) in the selected row of pixels are stored on the first 36(m) and second 38(m) capacitors in the first sample and hold circuits 105(m) for each column. The second transistors 46(m) of the first sample and hold circuits 105(m) of each column are then turned off by the signal $V_{CL1}$ 76 while all of the row select transistors 28(Lm) for the selected row remain on, the first 32(m) transistors of the first sample and hold circuits 105(m) remain on, and the first 34(m) and second 48(m) transistors of the second sample and hold circuits 110(m) remain off. This isolates the second 38(m) capacitors in the first sample and hold circuits 105(m) of each column and the signals stored on those second capacitors 38(m) are retained. As the second transistors 46(m) of the first sample and hold circuits 105(m) are turned off the reset transistors 22(Lm) for the selected row are turned on by the signal $V_{RST}$ 80 resetting the potential on the photodiodes 26(Lm) in the selected row. The first transistors 32(m) of the first sample and hold circuits 105(m) and the reset transistors 22(Lm) for the selected row are then turned off by the signals $V_{SH1}$ 72 and $V_{RST}$ 80. This completes the read and reset of the photodiodes 26(Lm) in the selected row and signals related to the light impinging on the photodiodes 26(Lm) during the integration period are captured on the second capacitors 38(m) of the first sample and hold circuits 105(m). These signals will also contain fixed pattern noise.

In the key step of this invention the photodiodes 26(Lm) in the selected row are immediately read again to obtain a dark signal for the photodiodes in the selected row 26(Lm). All of the row select transistors 28(Lm) for the selected row are kept on by the signal $V_{ROW}$ 70, the reset transistors 22(Lm) are turned off by the signal $V_{RST}$ 80, the first 34(m) and second 48(m) transistors of the second sample and hold circuits 110(m) are turned on by the signals $V_{SH2}$ 74 and $V_{CL2}$ 78, the first 32(m) and second 46(m) transistors of the first sample and hold circuits 105(m) are turned off by the signals $V_{SH1}$ 72 and $V_{CL1}$ 76, and signals related to the potentials of the photodiodes 26(Lm) in the selected row of pixels are stored on the first 40(m) and second 42(m) capacitors in the second sample and hold circuits 10(m) for each column. The second transistors 48(m) of the second sample and hold circuits 110(m) of each column are then turned off by the signal $V_{CL2}$ 78 while all of the row select transistors 28(Lm) for the selected row remain on, the first transistors 34(m) of the second sample and hold circuits 10(m) remain on, and the first 32(m) and second 46(m) transistors of the first sample and hold circuits 105(m) remain off. This isolates the second 42(m) capacitors in the second sample and hold circuits 110(m) of each column and the signals stored on those second capacitors 42(m), which are related to the dark signals for the photodiodes 26(Lm) in the selected row, are retained. As the second transistors 48(m) of the second sample and hold circuits 110(m) are turned off the reset transistors 22(Lm) for the selected row are turned on by the signal $V_{RST}$ 80 resetting the potential on the photodiodes 26(Lm) in the selected row in preparation for the next integration period. The first transistors 34(m) of the second sample and hold circuits 110(m) and the reset transistors 22(Lm) for the selected row are then turned off by the signals $V_{SH2}$ 74 and $V_{RST}$ 80. This completes the dual read and reset of the photodiodes 26(Lm) in the selected row so that signals related to the light impinging on the photodiodes 26(Lm) during the integration period are captured on the second capacitors 38(m) of the first sample and hold circuits 105(m) and signals related to dark photodiodes 26(Lm), related to fixed pattern noise, are captured on the second capacitors 42(m) of the second sample and hold circuits 110(m).

Figure 4:
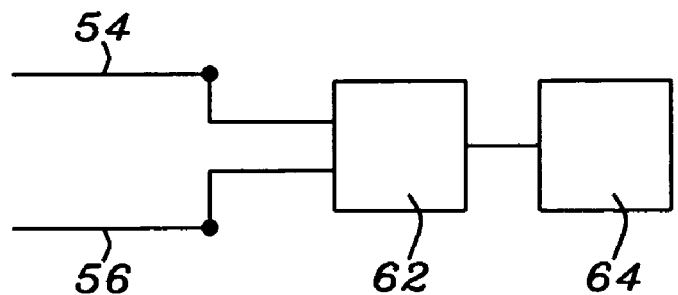
FIG. 4 shows a block diagram of the circuit and method of fixed pattern noise correction of this invention.

As shown in FIG. 4 the first output bus 54 and the second output bus 56 are connected to a subtraction unit 62. The subtraction unit 62 subtracts the signal on the second output bus 56 from the signal on the first output bus 54. As the third transistor 11(m) of the first sample and hold circuit 105(m) and the third transistor 15(m) of the second sample and hold circuit 110(m) of each column are turned on by column select signals applied to the column select node 60(m) for that column, where m takes on integral values from 1 to M, the signal related to the light impinging on the photodiode in the selected row and that column 26(Lm) during the integration period and fixed pattern noise is placed on the first bus 54 and the signal related to the dark photodiode 26(Lm) in the selected row and that column, due to fixed pattern noise, is placed on the second bus 56, see FIG. 2. This produces a signal at the output of the subtraction unit 62 related to the light impinging on the photodiode 26(Lm) in row L and column m corrected for fixed pattern noise. The output of the subtraction unit 62 is connected to a buffer 64 so that the signal related to the light impinging on the pixel in row L and column m corrected for fixed pattern noise is stored in the buffer 64 where it can be read out to a display unit, not shown. The column select signals applied to the column select nodes 60(m), where m takes on positive integer values from 1 to M, turn the third transistors 11(*m*) of the first sample and hold circuits 105(*m*) and the third transistors 15(*m*) of the second sample and hold circuits 110(*m*) on sequentially which sequentially places light related signals on the first output bus 54 and dark photodiode signals on the second output bus 56. The subtraction unit 62 then sequentially sends signals related to light seen by the photodiodes 26(Lm) in the selected row, where m takes on positive integer values from 1 to M, corrected for fixed pattern noise to the buffer 64. After all the pixels in row L have been read in this manner a new row is selected and the readout process repeated.

In the circuit and method of this invention only one subtraction unit 62 is required for the entire imager and a large memory to store dark pixel coefficients for all the pixels in the imager is not required. The subtraction unit 62 can be a digital subtraction unit and the subtraction can be carried out in the digital domain. The subtraction unit can also be an analog subtraction unit such as a differential video amplifier.

The example described above is for a particular example of an active pixel circuit and first and second sample and hold circuits. Those skilled in the art will readily recognize that the invention works equally well with other types of pixel circuits and/or sample and hold circuits.

Figure 5:
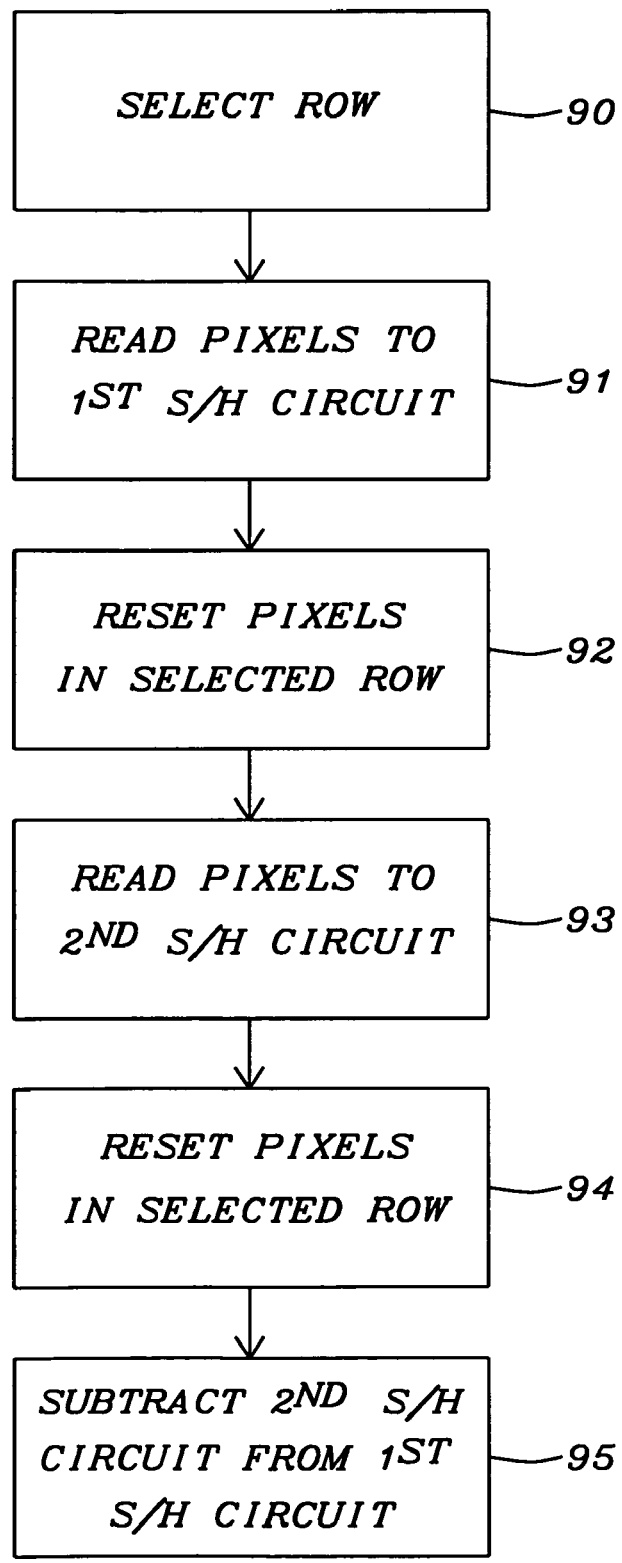
FIG. 5 shows a flow diagram for the method of this invention.

FIG. 5 shows a flow diagram for the key steps of this invention As shown in the first box 90 a row of pixels is selected. As shown in the next box 91 the pixels in the selected row are read into the first sample and hold circuit thereby storing a signal in the first sample and hold circuit equal to a signal due to light impinging on the pixel during the integration period plus fixed pattern noise. As shown in the next box 92 the selected row of pixels is reset. As shown in the next box 93 the pixels are immediately read a second time to the second sample and hold circuit thereby storing a dark pixel signal, which is related to fixed pattern noise, in the second sample and hold circuit. As shown in the next box 95 the signal in the second sample and hold circuit a subtraction unit is subtracted from the signal in the first sample and hold circuit producing a light related signal corrected for fixed pattern noise. The signals from the first and second sample and hold circuits can be sequentially fed to the subtraction unit and the output of the subtraction sent to a buffer so that only one subtraction unit is required for the imager.

While the invention has been particularly shown and described with reference to the preferred embodiments thereof, it will be understood by those skilled in the art that various changes in form and details may be made without departing from the spirit and scope of the invention.

What is claimed is:

1. A method of correcting for fixed pattern noise, comprising:
    providing a pixel having a photodiode;
    providing a first sample and hold circuit and a second sample and hold circuit, wherein said first sample and hold circuit and said second sample and hold circuit each comprise a first FET having a source, a drain, and a gate; a first capacitor having a first terminal connected to said drain of said first FET and a second terminal connected to ground potential; a second capacitor having a first terminal connected to said drain of said first FET and a second terminal; a second FET having a source connected to said second terminal of said second capacitor, a drain connected to ground potential, and a gate; and a third FET having a source connected to said source of said second FET, a gate, and a drain connected to an output bus;
    allowing light to impinge on said photodiode during an integration period;
    performing a first readout of said photodiode after said integration period has been completed and storing a first signal in said first sample and hold circuit wherein said first signal is related to the potential of said photodiode during said first readout of said photodiode;
    resetting said photodiode after performing said first readout of said photodiode;
    performing a second readout of said photodiode, after resetting said photodiode after performing said first readout of said photodiode, and storing a second signal in said second sample and hold circuit wherein said second signal is related to the potential of said photodiode during said second readout of said photodiode;
    resetting said photodiode after said second readout of said photodiode to prepare for the next integration period;
    subtracting said second signal from said first signal, thereby producing a signal related to the amount of light incident on said photodiode during said integration period corrected for fixed pattern noise.

2. The method of claim 1 wherein said resetting said photodiode comprises resetting the potential of said photodiode.

3. The method of claim 1 wherein said subtracting said second signal from said first signal can be accomplished in the digital domain or the analog domain.

4. A method of correcting for fixed pattern noise in an imager:
    providing an imager having an array of N rows and M columns of pixels, wherein N and M are positive whole numbers and each pixel has a photodiode;
    providing a first sample and hold circuit having an input and an output and a second sample and hold circuit having an input and an output for each of said columns of pixels, wherein a signal stored in said first sample and hold circuit is connected to said output of that said first sample and hold circuit and a signal stored in said second sample and hold circuit for the same said column of pixels is connected to said output of that said second sample and hold circuit when said first sample and hold circuit and said second sample and hold circuit for that said column of pixels are activated;
    providing a single subtraction unit having a first input connected to said outputs of each of said first sample and hold circuits, a second input connected to said outputs of each of said second sample and hold circuits, and an output wherein the signal at said output of said subtraction unit is equal to the signal at said second input of said subtraction unit subtracted from the signal at said first input of said subtraction unit;
    providing a buffer having an input connected to said output of said subtraction unit;
    selecting one of said rows of pixels;
    performing a first readout of said pixels in said selected row of pixels after an integration period and storing a first signal for each said pixel in said selected row of pixels in that said first sample and hold circuit associated with the same said column of pixels, wherein said first signal for each said pixel in said selected row of pixels is related to the potential of the photodiode in that said pixel at the time of said first readout;
    resetting the potential of said photodiodes in said selected row of pixels after said first readout of said pixels in said selected row of pixels;
    performing a second readout of said pixels in said selected row of pixels, immediately following said resetting the potential of said photodiodes in said selected row of pixels after said first readout, and storing a second signal for each said pixel in said selected row of pixels in that said second sample and hold circuit associated with the same said column of pixels, wherein said second signal for each said pixel in said selected row of pixels is related to the potential of the photodiode in that said pixel at the time of said second readout;

resetting the potential of said photodiodes in said selected row of pixels after said second readout of said pixels in said selected row of pixels to prepare for the next integration period; and sequentially activating said first sample and hold circuit and said second sample and hold circuit for each of said M columns of pixels, thereby storing signals related to the amount of light incident on each of said photodiodes in said selected row of pixels during an integration period corrected for fixed pattern noise in said buffer.

5. The method of claim 4 wherein said subtraction unit is a digital subtraction unit and the signal at said output of said subtraction unit is produced in the digital domain.

6. The method of claim 4 wherein said subtraction unit is a differential video amplifier and the signal at said output of said subtraction unit is produced in the analog domain.

7. The method of claim 4 wherein each said first sample and hold circuit for each said column and each said second sample and hold circuit for each said column comprises:

a first FET having a source connected to said input of said first or second sample and hold circuit, a drain, and a gate;

a first capacitor having a first terminal connected to said drain of said first FET and a second terminal connected to ground potential;

a second capacitor having a first terminal connected to said drain of said first FET and a second terminal;

a second FET having a source connected to said second terminal of said second capacitor, a drain connected to ground potential, and a gate; and a third FET having a source connected to said source of said second FET, a drain, and a gate, wherein said drain of said third FET of said first sample and hold circuit is connected to said output of said first sample and hold circuit, and said drain of said third FET of said second sample and hold circuit is connected to said output of said second sample and hold circuit.

8. The method of claim 7 wherein said storing a first signal for each said pixel in said selected row of pixels in that said first sample and hold circuit associated with the same said column of pixels is accomplished using control signals applied to said gates of said first FET and said second FET of that said first sample and hold circuit.

9. The method of claim 7 wherein said storing a second signal for each said pixel in said selected row of pixels in that said second sample and hold circuit associated with the same said column of pixels is accomplished using control signals applied to said gates of said first FET and said second FET of that said second sample and hold circuit.

10. The method of claim 7 wherein said sequentially activating said first sample and hold circuit and said second sample and hold circuit for each of said M columns of pixels is accomplished by applying sequenced select signals to said gate of said third FET in said first sample and hold circuit and said gate of said third FET in said second sample and hold circuit for each of said columns.

11. The method of claim 4 wherein said selecting one of said rows of pixels is accomplished using a row select FET for each said pixel.

12. A circuit for correcting for fixed pattern noise in an imager:

an imager having an array of N rows and M columns of pixels, wherein N and M are positive whole numbers and each pixel has a photodiode;

a first sample and hold circuit having an input and an output and a second sample and hold circuit having an input and an output for each of said columns of pixels, wherein a signal stored in said first sample and hold circuit is connected to said output of that said first sample and hold circuit and a signal stored in said second sample and hold circuit for the same said column of pixels is connected to said output of that said second sample and hold circuit when said first sample and hold circuit and said second sample and hold circuit for that said column of pixels are activated;

a single subtraction unit having a first input connected to said outputs of each of said first sample and hold circuits, a second input connected to said outputs of each of said second sample and hold circuits, and an output wherein the signal at said output of said subtraction unit is equal to the signal at said second input of said subtraction unit subtracted from the signal at said first input of said subtraction unit;

a buffer having an input connected to said output of said subtraction unit;

means for selecting one of said rows of pixels;

means for performing a first readout of said pixels in said selected row of pixels after an integration period and storing a first signal for each said pixel in said selected row of pixels in that said first sample and hold circuit associated with the same column of pixels, wherein said first signal for each said pixel in said selected row of pixels is related to the potential of the photodiode in that said pixel at the time of said first readout;

means for resetting the potential of said photodiodes in said selected row of pixels after said first readout of said pixels in said selected row of pixels;

means for performing a second readout of said pixels in said selected row of pixels, immediately following said resetting the potential of said photodiodes in said selected row of pixels after said first readout, and storing a second signal for each said pixel in said selected row of pixels in that said second sample and hold circuit associated with the same column of pixels, wherein said second signal for each said pixel in said selected row of pixels is related to the potential of the photodiode in that said pixel at the time of said second readout;

means for resetting the potential of said photodiodes in said selected row of pixels after said second readout of said pixels in said selected row of pixels, to prepare for the next integration period; and means for sequentially activating said first sample and hold circuit and said second sample and hold circuit for each of said M columns of pixels, thereby storing signals related to the amount of light incident on each of said photodiodes in said selected row of pixels during an integration period corrected for fixed pattern noise in said buffer.

13. The circuit of claim 12 wherein said subtraction unit is a digital subtraction unit and the signal at said output of said subtraction unit is produced in the digital domain.

14. The circuit of claim 12 wherein said subtraction unit is a differential video amplifier and the signal at said output of said subtraction unit is produced in the analog domain.

15. The circuit of claim 12 wherein each said first sample and hold circuit for each said column and each said second sample and hold circuit for each said column comprises:

a first FET having a source connected to said input of said first or second sample and hold circuit, a drain, and a gate;

a first capacitor having a first terminal connected to said drain of said first FET and a second terminal connected to ground potential;

a second capacitor having a first terminal connected to said drain of said first FET and a second terminal;

a second FET having a source connected to said second terminal of said second capacitor, a drain connected to ground potential, and a gate; and a third FET having a source connected to said source of said second FET, a drain, and a gate, wherein said drain of said third FET in said first sample and hold circuit is connected to said output of said first sample and hold circuit, and said drain of said third FET in said second sample and hold circuit is connected to said output of said second sample and hold circuit.

16. The circuit of claim 15 wherein said storing a first signal for each said pixel in said selected row of pixels in that said first sample and hold circuit associated with the same said column of pixels is accomplished using control signals applied to said gates of said first FET and said second FET of that said first sample and hold circuit.

17. The circuit of claim 15 wherein said storing a second signal for each said pixel in said selected row of pixels in that said second sample and hold circuit associated with the same said column of pixels is accomplished using control signals applied to said gates of said first FET and said second FET of that said second sample and hold circuit.

18. The circuit of claim 15 wherein said sequentially activating said sample and hold circuit pairs for each of said M columns of pixels is accomplished by applying sequenced select signals to said gate of said third FET in said first sample and hold circuit and said gate of said third FET in said second sample and hold circuit for each of said columns.

19. The circuit of claim 12 wherein said means for selecting one of said rows of pixels comprises a row select FET for each said pixel.

* * * * *